United States Patent [19]

Badzioch

[11] Patent Number: 4,507,369

[45] Date of Patent: Mar. 26, 1985

[54] GLASS CERAMIC IONIC CONDUCTOR MATERIALS AND METHOD OF MAKING

[75] Inventor: Stanislaw Badzioch, London, England

[73] Assignee: United States Borax & Chemical Corporation, Los Angeles, Calif.

[21] Appl. No.: 487,499

[22] Filed: Apr. 21, 1983

Related U.S. Application Data

[63] Continuation-in-part of Ser. No. 439,020, Nov. 3, 1982, abandoned.

[30] Foreign Application Priority Data

Nov. 10, 1981 [GB] United Kingdom ............... 8133825

[51] Int. Cl.³ .................. H01M 4/36; H01M 6/14; C03B 32/00; C03C 3/22
[52] U.S. Cl. .................. 429/104; 429/193; 429/199; 65/33; 501/3; 501/10
[58] Field of Search ............ 429/193, 199, 104, 202; 501/3, 10, 32, 43, 49; 65/33

[56] References Cited

U.S. PATENT DOCUMENTS

| | | |
|---|---|---|
| 3,523,817 | 7/1967 | Reiss .................. 501/3 X |
| 3,829,331 | 8/1974 | Tsang .................. 501/43 X |
| 3,911,085 | 10/1975 | Bither et al. .......... 429/199 X |
| 3,980,499 | 9/1976 | Bither et al. .......... 429/104 X |
| 4,042,362 | 8/1977 | MacDowell et al. ....... 65/33 |
| 4,307,163 | 12/1981 | Joshi et al. .......... 429/193 X |

FOREIGN PATENT DOCUMENTS 129895 2/1978 German Democratic Rep. .

OTHER PUBLICATIONS

Chemical Abstracts: No. 80: 99408, Pavlushkin et al; No. 83: 19620, Tsang; No. 91: 219878, Lavasseur et al.; No. 37: 2646(6); No. 37: 2646(8).

Primary Examiner—Brian E. Hearn
Assistant Examiner—Stephen J. Kalafut
Attorney, Agent, or Firm—James R. Thornton

[57] ABSTRACT

Solid, crystalline glass ceramic compositions which are useful as ionic conductor materials, especially for use as solid electrolytes in high temperature, high energy density storage batteries. The glass ceramics are derived from sodium or calcium borates containing one or more metal halide, preferably the chlorides and bromides of the metals from Group 2 to 8 of the Periodic Table of the Elements.

24 Claims, 3 Drawing Figures

96 WT. % $CaB_4O_7$ – 4 WT. % $CaCl_2$

GLASS CERAMIC IONIC CONDUCTOR MATERIALS AND METHOD OF MAKING

This is a continuation-in-part of my copending application Ser. No. 439,020 filed Nov. 3, 1982, and now abandoned.

FIELD OF THE INVENTION

This invention relates to solid ionic conductor materials for metal ions, to their preparation and to their use as solid electrolytes.

BACKGROUND OF THE INVENTION

Solid ionic conductor materials find particular use as solid electrolytes in high temperature, high energy density storage batteries. The anode reactant in such batteries usually is sodium or lithium, and electrolyte materials that are capable of conducting alkali metal cations and of withstanding the harsh environment within the batteries are of particular interest as solid electrolytes.

The conduction of lithium ions in various borate glasses has been extensively studied; see for example Irion et al, *J. Solid State Chem.*, 31. 285–294 (1980) where vitreous fast ionic conductors in the system $B_2O_3$ -$Li_2O$-$LiCl$ are described, Smedley and Angell, *Mat. Res. Bull.*, 15 (4), 421–425 (1980) where conductivity measurements in the $Li_2O$-$LiF$-$B_2O_3$ system are reported and U.S. Pat. No. 4,184,015 which describes an amorphous cationic conductor of lithium comprising a composition corresponding to the general formula $(B_2O_3,xM.yN).aLi_2O.bLi_zQ$ where M is selected from $Al_2O_3$, $V_2O_5$, $P_2O_5$, $As_2O_5$ and $As_2O_3$, N is selected from $SiO_2$ and $GeO_2$ and Q may be a halogen anion or other anions, exclusive of $O^{2-}$.

U.S. Pat. No. 3,911,085 describes the preparation of crystalline lithium haloboracites of the formula $Li_4B_7O_{12}X$ where X is Cl, Br, I or a mixture thereof which are useful as solid electrolytes for galvanic cells. The preferred lithium haloboracites are those in which X is a mixture of Br and Cl where Br is 20 to 50 mole percent of X.

The conduction of sodium or potassium ions in borate glasses has also been studied. Eichinger and Deublein, *Mat. Res. Bull.*, 15, 1263–1266 (1980) describe sodium phosphateborate glasses which exhibit high ionic conductivities for sodium ions. After milling of these amorphous compounds, crystallization occurred and densified samples showed higher conductivities than the glassy samples. The ionic conductivity of the polycrystalline compound $Na_8P_4B_2O_{17}$ at 300° C. is between $10^{-1}$ and $10^{-2}$ ohm$^{-1}$ cm$^{-1}$ which compares favorably with β-alumina, the most often used of all cationic conductors. However, being crystalline, these compounds suffer from the usual disadvantages associated with pressing and sintering of bodies.

U.S. Pat. No. 3,829,331 describes an amorphous glass system based on sodium borate which is said to demonstrate reasonably high sodium ion conductance. The compositions, which may contain halide additives to modify viscosity, expansion coefficient and the like, are said to have utility as the membrane material in alkali metal-sulfur batteries. U.S. Pat. No. 3,877,995 describes analogous amorphous glass systems based on potassium borate which are also said to have utility as the membrane material in alkali metal-sulfur batteries.

SUMMARY OF THE INVENTION

The present invention provides solid ionic conductor materials which are glass ceramics prepared by crystallization from a glass derived from a composition comprising sodium or calcium borate and a source of halogen selected from the metal chlorides, bromides and/or iodides.

DRAWINGS

DESCRIPTION OF THE INVENTION

Figure 1:
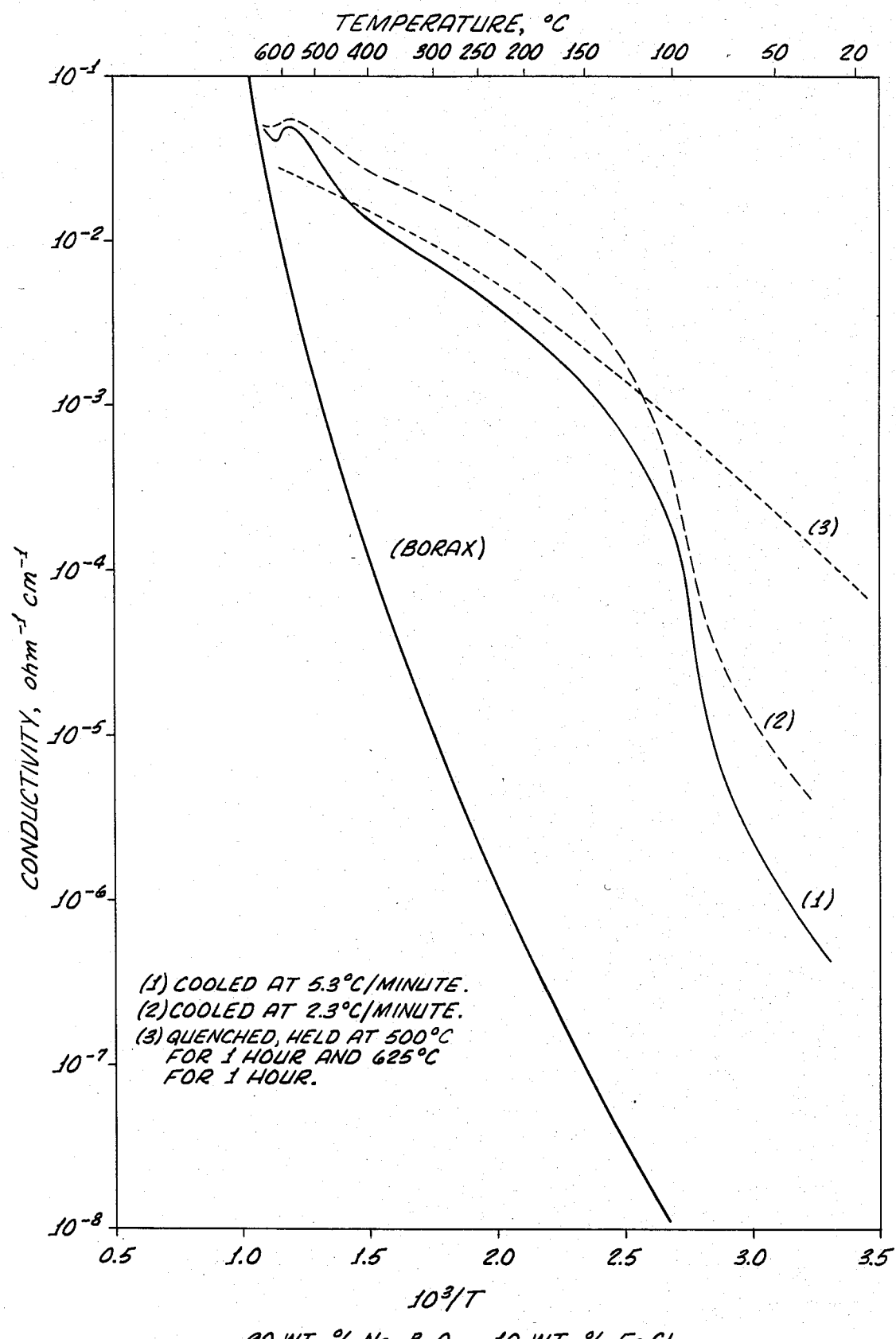
FIGS. 1 and 2 are graphs illustrating the results of Example II.

The preparation of glass ceramics from glasses requires crystallization of the amorphous glass and can be achieved by well established methods such as by subjecting the glass to a heat-treatment that results in the growth of crystal phases within the glass. In glass ceramics, the crystalline phases form by crystal growth from a homogeneous glass phase unlike traditional ceramics in which most of the crystalline material is introduced when the ceramic composition is prepared.

The glasses can be formed by melting the mixtures into a glass at about 800° to about 1000° C. for a period of up to about 2 hours, with the temperature and melting time depending primarily on the melting point and/or volatility of the halides. The solid ionic conductor materials can be obtained by treating the resulting glasses in such a way that crystallization takes place and a glass ceramic is formed. The conversion of the glasses into glass ceramics results in a dramatic increase in low temperature ionic conductivity. For example, when the borate is a sodium borate, the ionic conductivities of the glass ceramics of the present invention at 200° C. are typically about $2.5 \times 10^{-3}$ ohm$^{-1}$ cm$^{-1}$ which is about 10,000 times higher than for the borate alone. Conductivities of the haloborate glasses are essentially the same as those of the parent borates alone.

It was surprising to find that the glasses (referred to herein as haloborate glasses) can be easily converted into haloborate glass ceramics, because it is generally known that the presence of boric oxide in glass compositions inhibits crystallization.

The preferred borate is borax ($Na_2O.2B_2O_3$ or $Na_2B_4O_7$) which is expressed herein as the anhydrous form. Borax, when used, may be mixed with boric oxide to adjust the $Na_2O:B_2O_3$ ratio, but increasing the $B_2O_3$ content tends to have a deleterious effect on conductivity; so that even a light dilution of borax with $B_2O_3$, for example to give an $Na_2O:B_2O_3$ ratio of 1:2.25, can produce a very marked deterioration in conductivity although the quality of the glasses is not impaired. With a ratio of 1:3 no conductivity enhancement was observed. On the other hand, increasing the $Na_2O$ content has little effect on conductivity but tends to result in the formation of glass ceramics with physically inferior properties. The 1:2 ratio, namely that of borax itself, provides the best results in terms both of ease of preparation of the glass ceramics and ionic conductivity.

Calcium borate may also be used but the conductivity of the resultant glass ceramic is far lower than with the sodium borates. The glass ceramics of the invention may also contain optional additives to modify physical properties such as viscosity-temperature relationship, coefficient of thermal expansion, response of the glasses to heat treatment, and the like. Such optional additives include Al₂O₃ and NaF.

The halides to be used in preparing the conductor materials of the present invention are preferably highly soluble and stable in molten borates and form excellent glasses upon rapid cooling or quenching. The source of halogen to be used is preferably one or more halides of the metals from Groups 2-8 of the Periodic Table of the Elements, including, for example, the transition metals and alkaline earth metals. Sodium halides such as sodium chloride and sodium bromide may also be used. Examples of preferred halides include the iron, chromium, cobalt, manganese, zinc, calcium, magnesium, lead and lanthanum chlorides and bromides, with the chlorides being especially preferred. Mixtures of metal halides may also be used if desired. Where the metal halide would be expected to be excessively volatile to be incorporated into a molten borate system, this problem may be overcome by using an initial charge consisting of a mixture of substantially nonvolatile reagents chemically equivalent to the desired borate/metal halide composition. Hence a composition equivalent to, for example, the borax-AlCl₃ system, can be prepared from a mixture of borax, B₂O₃, NaCl and Al₂O₃ taken in appropriate quantities.

The amount of halide incorporated into the glass ceramics of the present invention should be such as to provide the desired ionic conductivity. Generally, a halogen content of up to about 30 weight percent can be used, depending on the specific halide employed. For example, in the case of chlorides, about 4 to 10 weight percent chlorine can be used but the optimum chlorine content of the glass ceramic for maximum ionic conductivity lies between about 5 to 9 weight percent. Similarly, there is an optimum bromine content between about 10 and 20 weight percent for maximum ionic conductivity in bromide containing systems; this higher range is in proportion to the increased atomic weight of bromine relative to chlorine. When iodides are used, a correspondingly higher amount is incorporated.

The compositions of this invention may be defined by the following formula:

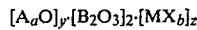

$$[A_aO]_y \cdot [B_2O_3]_2 \cdot [MX_b]_z$$

wherein

A is Na or Ca and a is 2 or 1, respectively;

M is sodium or one or more metal from Groups 2-8 of the Periodic Table;

X is halogen, preferably chlorine or bromine;

y is 0.9 to 2;

b is the valence of M (1-5); and zb is 0.25 to 0.70, preferably 0.35 to 0.60.

When several halides are used the effective zb is the sum of the zb values for the individual component halides.

The effect of chlorine content on conductivity is illustrated in Table 1 for the system borax-FeCl₂.

TABLE 1

| FeCl₂ (wt. %) | Metal (wt. %) | Chlorine (wt. %) | Observed Conductivities (ohm⁻¹cm⁻¹) at | | |
|---|---|---|---|---|---|
| | | | 300° C. | 250° C. | 200° C. |
| 0 | — | — | $5.9 \times 10^{-6}$ | $1.3 \times 10^{-6}$ | $2.8 \times 10^{-7}$ |
| 5 | 2.2 | 2.8 | $3.3 \times 10^{-5}$ | $1.0 \times 10^{-5}$ | $2.2 \times 10^{-6}$ |
| 10 | 4.4 | 5.6 | $1.1 \times 10^{-2}$ | $6.7 \times 10^{-3}$ | $3.1 \times 10^{-3}$ |
| 12.5 | 5.5 | 7.0 | $6.7 \times 10^{-3}$ | $5.7 \times 10^{-3}$ | $4.2 \times 10^{-3}$ |
| 15 | 6.6 | 8.4 | $8.0 \times 10^{-3}$ | $5.3 \times 10^{-3}$ | $2.9 \times 10^{-3}$ |

TABLE 1-continued

| FeCl₂ (wt. %) | Metal (wt. %) | Chlorine (wt. %) | Observed Conductivities (ohm⁻¹cm⁻¹) at | | |
|---|---|---|---|---|---|
| | | | 300° C. | 250° C. | 200° C. |
| 20 | 8.8 | 11.2 | $2.5 \times 10^{-6}$ | $6.1 \times 10^{-7}$ | $1.2 \times 10^{-7}$ |
| 30 | 13.2 | 16.8 | $3.2 \times 10^{-6}$ | $9.1 \times 10^{-7}$ | $1.7 \times 10^{-7}$ |

The results of this and other studies utilizing different metal chlorides indicate that chlorine content, rather than metal chloride content, is the more important parameter for correlating data.

For the most part, the results show that the concentration of halogen is more important than the source of that halogen, with the metal cations playing only a secondary role. Thus, for example in the chloroborate system, the chloride of any Group 2-8 metal, sodium or mixtures thereof, can serve as the source of the chloride ion. While the mechanism of ionic conductivity is not fully understood, the results suggest that the halide anions become incorporated into the structure of the glass ceramic forming a fixed lattice in which ionic motion is very facile. For some compositions the conductivities vary smoothly with change in temperature down to room temperature, whereas, with other compositions, the conductivities fall steeply at around 100° C., probably due to a phase transition in the conductivity-imparting compound or compounds. The phase transition may be prevented by increasing the amount of halide, by using as the source of the halogen the same or different metal halide, or by altering the heat treatment procedure.

The enhancement in conductivity that can be obtained in accordance with the present invention is dependent upon conversion of the initially formed glass into a glass ceramic. Thus, a glass quenched from the melting temperature to ambient temperature has much the same low-temperature conductivity as the borate alone. When, however, such a glass is heat treated so as to permit crystallization, its conductivity is greatly enhanced. The nucleation and crystallization stages involved in converting a glass into a glass ceramic can be controlled by appropriate heat treatment which will determine the number and size of the microcrystals (see P. W. McMillan "Glass Ceramics," Academic Press, London, 1964, pages 100 et seq.). The optimum conditions for the heat treatment required to provide the glass ceramics of the present invention can be established by suitably designed experiments.

It has been found that haloborate glasses can be converted into haloborate glass ceramics so easily that simplified heat treatment procedures can be used. For example, the formation of a glass ceramic can be effected by slow cooling of the fused product of the haloborate composition through the crystallization region. For example, the rate of cooling at about 600° C., where crystallization usually occurs, is typically about 2° to 10° C. per minute for a sodium chloroborate system.

Alternatively, the glass ceramics may be formed by maintaining the previously quenched glasses at elevated temperatures, for example, between about 550° and 650° C., for periods of time up to about 3 hours, with about 0.5 to about 2 hours generally being adequate.

The optimum heat treatment conditions to obtain the maximum ionic conductivity varies to some extent with each composition. Although the metal added with the chloride plays little part, if any, in the ionic conductivity, it affects the physical properties such as the viscosity-temperature relationship which in turn affects the response to heat treatment.

In some cases, however, it was observed that the conductivities obtained with certain compositions were completely unaffected by the nature of the heat treatment. Examination of the differential thermal analysis (D.T.A.) curves showed that each of the compositions was characterized by the absence of crystallization and crystal melting peaks, implying that the crystal growth proceeds very readily over a wide range of temperatures.

The systems which were found to be most responsive to heat treatment were those characterized by sharp exothermic crystallization peaks on their D.T.A. curves. Thus, it is preferable before examining possible heat treatment procedures first to obtain an analysis by D.T.A.

The crystallization temperature may be satisfactorily estimated from the position of the crystallization exotherm on the D.T.A. curve. The choice of the crystallization temperature, which usually lies within the range 550°–650° C. for sodium chloroborates, is not critical. The crystallization appears to proceed rapidly and may be completed in a period as short as 0.5 to 1 hour. The crystallization temperature for calcium chloroborates is higher, typically about 800° C.

More than one potentially mobile alkali metal cation, such as $Na^+$ and $K^+$, should not be used as systems such as these appear to have no practical applications apart from having very low conductivities.

Once the solid ionic conductor glass ceramics of the present invention have been formed they can withstand repeated high temperature treatments or cycling, providing that the temperatures encountered during such re-heating operations are not such that the crystalline nature of the glass ceramic is adversely affected.

The ionic conductivities of the haloborate glass ceramics compare favorably with those of the ionic conductors for lithium ions referred to above and are considerably higher than those of the conductors for sodium ions. The conductivity of β-alumina conductors, known ionic conductors for use in alkali metal-sulfur cells, are higher than those of the haloborate glass ceramics of the present invention, but β-alumina has the disadvantage of being brittle as well as having other difficulties associated with the high temperatures (ca, 1850° C.) required in the sintering.

The invention is further illustrated by reference to the following examples.

EXAMPLE 1

Measurements of electrical conductivities of haloborate compositions in accordance with the invention were made using an a.c. ammeter-voltmeter method by applying a low voltage of approximately 1 V at 50 Hz between the crucible and axial electrode described below. A graphite crucible of generally circular cross-section, outside diameter of 51 mm. and inner diameter of 38 mm. was used. The crucible was 51 mm. deep and its walls and floor about 6.5 mm. thick. The graphite crucible served as one of the electrodes during measurement of electrical conductivity, with an axial graphite rod 6.5 mm. in diameter serving as the other electrode. An insulating boron nitride disc was placed at the bottom of the crucible to form a system with radial symmetry, all current flow being radial. The crucible was filled with mixed powdered charge, usually 70 grams, consisting of a borate with the desired halide, or an alternative charge chemically equivalent to the desired borate-halide system. The charge was melted at 800° to 1000° C. for 0.5 to 2 hours in an inert atmosphere (nitrogen).

The conductivities of the fused products in the crucible were measured during cooling within the furnace. The rate of cooling within the range of 650°–550° C., where crystallization usually occurred, was about 5° to 6° C. per minute.

The results are summarized in Table 2. The halide contents stated in the table are based on the compositions of the initial mixtures; the compositions are also expressed in terms of the contents of the metal and the halogen. The metal and halogen contents agree well with the results of chemical analyses, showing that there was in most cases a complete retention of both metal and halogen in the products, indicating complete dissolution of the halide in the borate after allowing for slight losses of some halides by sublimation during melting. This, however, does not apply to systems containing CuCl and $CuCl_2$, where precipitation of elemental metals occurs during melting. A slight reduction to metal has also been observed with $NiCl_2$, but far less than with the copper chlorides. The liberation of metal during the glass-forming reaction complicates the preparation of the ionic conductors of the present invention by making necessary the introduction of an additional stage to separate precipitated metal from the glass phase. Thus, halides giving rise to such problems are therefore preferably not used.

In assessing the quality of an ionic conductor obtained upon crystallization, a cell as described above, comprising a graphite crucible as anode, axial graphite rod as cathode and glass ceramic as solid electrolyte and serving at the same time as the source of sodium ions was charged by passing direct current through it. An EMF of typically about 2 V or above was observed after charging. This cell could be discharged through an external resistance load. With a good ionic conductor, having negligible electronic conductivity, only a slow decay of the voltage and current, due to polarization, is observed during the discharge.

TABLE 2

Summary of Experiments on Ionic Conductivities of Sodium Haloborate Compositions

| Test No. | Halide and its Content (wt. %) | Molar Compositions | Metal (wt. %) | Halogen (wt. %) | Observed Conductivities ($ohm^{-1}cm^{-1}$) at °C. | | |
|---|---|---|---|---|---|---|---|
| | | | | | 300 | 250 | 200 |
| $Na_2B_4O_7$ (Control) | — | $Na_2B_4O_7$ | — | — | $5.9 \times 10^{-6}$ | $1.3 \times 10^{-6}$ | $2.8 \times 10^{-7}$ |
| Molten Solvent - borax ($Na_2B_4O_7$) | | | | | | | |
| 1 | $10CoCl_2$ | $[Na_2O][B_2O_3]_2[CoCl_2]_{0.17}$ | 4.5 | 5.5 | $1.0 \times 10^{-2}$ | $6.7 \times 10^{-3}$ | $3.8 \times 10^{-3}$ |
| 2 | $10CrCl_3$ | $[Na_2O][B_2O_3]_2[CrCl_3]_{0.14}$ | 3.3 | 6.7 | $7.1 \times 10^{-3}$ | $5.0 \times 10^{-3}$ | $3.1 \times 10^{-3}$ |
| 3 | $20PbCl_2$ | $[Na_2O][B_2O_3]_2[PbCl_2]_{0.18}$ | 14.9 | 5.1 | $9.1 \times 10^{-3}$ | $6.0 \times 10^{-3}$ | $3.6 \times 10^{-3}$ |
| 4 | $12.5MnCl_2$ | $[Na_2O][B_2O_3]_2[MnCl_2]_{0.23}$ | 5.5 | 7.0 | $3.7 \times 10^{-3}$ | $2.5 \times 10^{-3}$ | $1.5 \times 10^{-3}$ |
| 5 | $10ZnCl_2$ | $[Na_2O][B_2O_3]_2[ZnCl_2]_{0.16}$ | 4.8 | 5.2 | $1.5 \times 10^{-3}$ | $1.0 \times 10^{-3}$ | $5.9 \times 10^{-4}$ |

TABLE 2-continued

Summary of Experiments on Ionic Conductivities of Sodium Haloborate Compositions

| Test No. | Halide and its Content (wt. %) | Molar Compositions | Metal (wt. %) | Halogen (wt. %) | | Observed Conductivities (ohm$^{-1}$cm$^{-1}$) at °C. | | |
|---|---|---|---|---|---|---|---|---|
| | | | | | | 300 | 250 | 200 |
| 6 | 18LaCl$_3$ | [Na$_2$O] [B$_2$O$_3$]$_2$[LaCl$_3$]$_{0.18}$ | 10.2 | 7.8 | | 1.7 × 10$^{-3}$ | 1.3 × 10$^{-3}$ | 9.2 × 10$^{-4}$ |
| 7 | 10CaCl$_2$ | [Na$_2$O] [B$_2$O$_3$]$_2$[CaCl$_2$]$_{0.20}$ | 3.6 | 6.4 | | 2.4 × 10$^{-3}$ | 1.7 × 10$^{-3}$ | 1.2 × 10$^{-3}$ |
| 8 | 10SrCl$_2$ | [Na$_2$O] [B$_2$O$_3$]$_2$[SrCl$_2$]$_{0.14}$ | 5.5 | 4.5 | | 5.0 × 10$^{-3}$ | 3.8 × 10$^{-3}$ | 2.4 × 10$^{-3}$ |
| 9 | 10MgCl$_2$ | [Na$_2$O] [B$_2$O$_3$]$_2$[MgCl$_2$]$_{0.23}$ | 2.6 | 7.4 | | 2.8 × 10$^{-3}$ | 1.8 × 10$^{-3}$ | 1.1 × 10$^{-3}$ |
| 10 | 34PbBr$_2$ | [Na$_2$O] [B$_2$O$_3$]$_2$[PbBr$_2$]$_{0.28}$ | 19.0 | 15.0 | | 3.1 × 10$^{-3}$ | 1.9 × 10$^{-3}$ | 1.3 × 10$^{-3}$ |
| 11 | 20CaBr$_2$ | [Na$_2$O] [B$_2$O$_3$]$_2$[CaBr$_2$]$_{0.25}$ | 4.0 | 16.0 | | 1.3 × 10$^{-4}$ | 5.5 × 10$^{-5}$ | 2.2 × 10$^{-5}$ |
| 12 | 20.5NiBr$_2$ | [Na$_2$O] [B$_2$O$_3$]$_2$[NiBr$_2$]$_{0.24}$ | 5.5 | 15.0 | | 1.4 × 10$^{-3}$ | 5.6 × 10$^{-4}$ | 2.4 × 10$^{-4}$ |
| 13 | 20NaBr | [Na$_2$O] [B$_2$O$_3$]$_2$[NaBr]$_{0.49}$ | 4.5 | 15.5 | | 1.2 × 10$^{-3}$ | 6.7 × 10$^{-4}$ | 3.3 × 10$^{-4}$ |
| 14 | 10NaCl | [Na$_2$O] [B$_2$O$_3$]$_2$[NaCl]$_{0.38}$ | 3.9 | 6.1 | | 3.1 × 10$^{-3}$ | 2.5 × 10$^{-3}$ | 1.8 × 10$^{-3}$ |
| 15 | 17KCl | [Na$_2$O] [B$_2$O$_3$]$_2$[KCl]$_{0.55}$ | 8.9 | 8.1 | | 7.2 × 10$^{-5}$ | 2.2 × 10$^{-5}$ | 4.3 × 10$^{-6}$ |
| 16 | 9.6LiCl | [Na$_2$O] [B$_2$O$_3$]$_2$[LiCl]$_{0.5}$ | 1.6 | 8.0 | | 1.9 × 10$^{-4}$ | 7.6 × 10$^{-5}$ | 2.6 × 10$^{-5}$ |
| | | Mixtures of halides | | | | | | |
| 17 | 10FeCl$_2$ | [Na$_2$O] [B$_2$O$_3$]$_2$[FeCl$_2$]$_{0.19}$· | 4.4 | 5.6 | 8.8 | 1.4 × 10$^{-2}$ | 1.1 × 10$^{-2}$ | 7.7 × 10$^{-3}$ |
| | 5CaCl$_2$ | [CaCl$_2$]$_{0.11}$ | 1.8 | 3.2 | | | | |
| 18 | 10FeCl$_2$ | [Na$_2$O] [B$_2$O$_3$]$_2$[FeCl$_2$]$_{0.18}$· | 4.4 | 5.6 | 6.3 | 1.2 × 10$^{-2}$ | 7.1 × 10$^{-3}$ | 4.3 × 10$^{-3}$ |
| | 2CuCl | [CuCl]$_{0.05}$ | 1.3 | 0.7 | | | | |
| | | Molten solvent - (1.5 Na$_2$O.2B$_2$O$_3$) | | | | | | |
| 19 | 10FeCl$_2$ | [Na$_2$O] [B$_2$O$_3$]$_2$[FeCl$_2$]$_{0.20}$ | 4.4 | 5.6 | | 5.3 × 10$^{-3}$ | 3.3 × 10$^{-3}$ | 1.7 × 10$^{-3}$ |
| 20 | 12.5FeCl$_2$ | [Na$_2$O] [B$_2$O$_3$]$_2$[FeCl$_2$]$_{0.26}$ | 5.5 | 7.0 | | 7.4 × 10$^{-3}$ | 5.4 × 10$^{-3}$ | 2.7 × 10$^{-3}$ |
| 21 | 15FeCl$_2$ | [Na$_2$O] [B$_2$O$_3$]$_2$[FeCl$_2$]$_{0.32}$ | 6.6 | 8.4 | | 6.1 × 10$^{-3}$ | 4.2 × 10$^{-3}$ | 2.2 × 10$^{-3}$ |
| 22 | 12.5CoCl$_2$ | [Na$_2$O] [B$_2$O$_3$]$_2$[CoCl$_2$]$_{0.26}$ | 5.7 | 6.8 | | 3.7 × 10$^{-3}$ | 2.4 × 10$^{-3}$ | 1.4 × 10$^{-3}$ |
| 23 | 12.5CrCl$_3$ | [Na$_2$O]$_{1.5}$[B$_2$O$_3$]$_2$[CrCl$_3$]$_{0.21}$ | 4.1 | 8.4 | | 3.7 × 10$^{-3}$ | 2.5 × 10$^{-3}$ | 1.4 × 10$^{-3}$ |
| 24 | 12.5MnCl$_2$ | [Na$_2$O] [B$_2$O$_3$]$_2$[MnCl$_2$]$_{0.26}$ | 5.5 | 7.0 | | 2.0 × 10$^{-3}$ | 1.5 × 10$^{-3}$ | 1.1 × 10$^{-3}$ |
| 25 | 12.5ZnCl$_2$ | [Na$_2$O] [B$_2$O$_3$]$_2$[ZnCl$_2$]$_{0.24}$ | 6.0 | 6.5 | | 2.3 × 10$^{-3}$ | 1.6 × 10$^{-3}$ | 1.0 × 10$^{-3}$ |
| 26 | 12.5CaCl$_2$ | [Na$_2$O] [B$_2$O$_3$]$_2$[CoCl$_2$]$_{0.30}$ | 4.5 | 8.0 | | 9.5 × 10$^{-4}$ | 5.6 × 10$^{-4}$ | 2.9 × 10$^{-4}$ |
| | | Mixture of chlorides | | | | | | |
| 27 | 8.8FeCl$_2$ | [Na$_2$O]$_{1.5}$[B$_2$O$_3$]$_2$[FeCl$_2$]$_{0.19}$ | 3.9 | 4.9 | 7.7 | 4.5 × 10$^{-3}$ | 3.6 × 10$^{-3}$ | 2.4 × 10$^{-3}$ |
| | 4.4CaCl$_2$ | [CaCl$_2$]$_{0.11}$ | 1.6 | 2.8 | | | | |
| | | Molten solvent - borax with added B$_2$O$_3$ | | | | | | |
| 28 | 90(Na$_2$O:2.25 B$_2$O$_3$)-10FeCl$_2$ | [Na$_2$O]$_{0.89}$[B$_2$O$_3$]$_2$[FeCl$_2$]$_{0.19}$ | 4.4 | 5.6 | | 5.3 × 10$^{-4}$ | 2.5 × 10$^{-4}$ | 1.3 × 10$^{-4}$ |
| | | Miscellaneous molten solvents | | | | | | |
| 29 | 90(AB* + 0.25 NaF)-10FeCl$_2$ | [Na$_2$O] [B$_2$O$_3$]$_2$[NaF]$_{0.25}$·[FeCl$_2$]$_{0.19}$ | 4.4 | 5.6 | | 2.9 × 10$^{-2}$ | 2.1 × 10$^{-2}$ | 1.2 × 10$^{-2}$ |
| 30 | 87.5(AB + 0.25 NaF)-12.5CrCl$_3$ | [Na$_2$O] [B$_2$O$_3$]$_2$[NaF]$_{0.25}$·[CrCl$_3$]$_{0.19}$ | 4.1 | 8.4 | | 4.2 × 10$^{-3}$ | 2.8 × 10$^{-3}$ | 1.4 × 10$^{-3}$ |
| | β - alumina electrolyte | — | — | — | | 1.8 × 10$^{-1}$ | 1.4 × 10$^{-1}$ | 1.0 × 10$^{-1}$ |

*AB = Anhydrous Borax

EXAMPLE II

In a series of comparative tests with haloborate compositions the following heat treatment procedures were investigated.

(a) Slow cooling of the melt at different rates;
(b) Quenching the melt, reheating to an assumed nucleation temperature and holding for a desired period, and subsequently raising the temperature to crystallization and holding for a desired period;
(c) Quenching the melt and then reheating directly to crystallization temperature, and holding for a desired period, obviating the nucleating stage, or by cooling the melt directly to the crystallization temperature.

Figure 2:
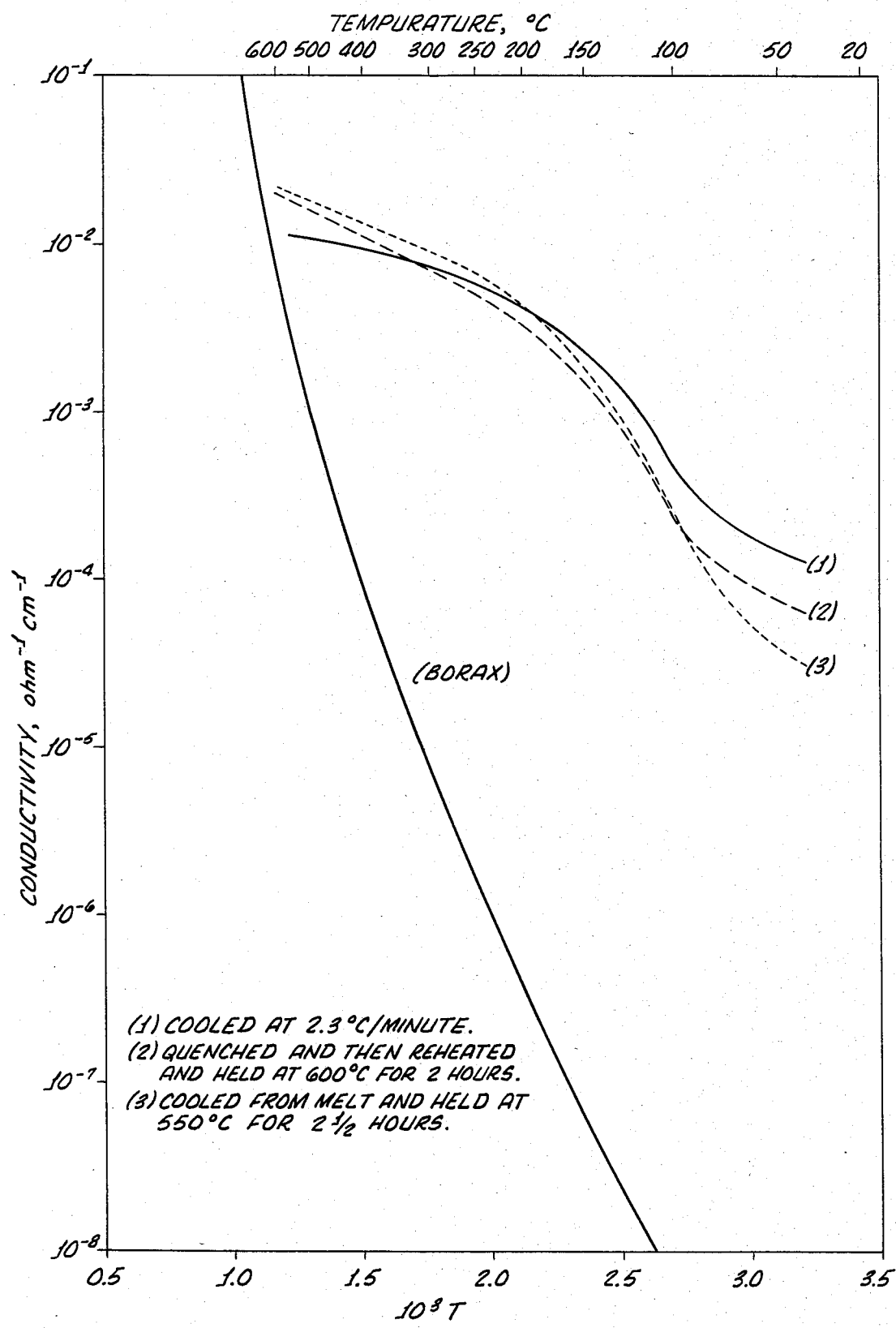

The results with FeCl$_2$ and CrCl$_3$ are illustrated in FIGS. 1 and 2, respectively. In both figures the glass ceramic contains 90 weight percent Na$_2$B$_4$O$_7$ and 10 weight percent metal halide.

FIG. 1, with FeCl$_2$, shows the phase transition observed at about 100° C. during slow cooling (1,2) can be eliminated by using the conventional heat treatment procedure (3) consisting of nucleation followed by crystallization. By elimination of the phase transition the usefulness of the haloborate glass ceramics may be extended down to room temperature.

FIG. 1 also shows that by slowing down the rate of cooling there was over a two-fold increase in the conductivity. Other tests showed, however, that on cooling even more slowly no further conductivity enhancement was obtained.

FIG. 2, with CrCl$_3$, shows that using simplified heat treatment procedures, there is little effect on the conductivities of the glass ceramic. There is little difference when the conversion into a glass ceramic is effected by the crystallization stage only at a selected temperature, without a prior nucleation stage, and also there is little difference whether the crystallization temperature is reached by cooling the melt or by heating quenched glass from room temperature.

EXAMPLE III

A glass ceramic whose final composition was equivalent to 91 wt. % borax and 9 wt. % VCl$_5$ or (Na$_2$O)(B$_2$O$_3$)$_2$(VCl$_5$)$_{0.09}$ was prepared from:

| | wt. % |
|---|---|
| Na$_2$B$_4$O$_7$ | 67.20 |

-continued

| | wt. % |
|---|---|
| $B_2O_3$ | 16.45 |
| NaCl | 11.54 |
| $NaVO_3$ | 4.81 |

The ionic conductivities measured at 300°, 250° and 200° C. were $1.7 \times 10^{-2}$, $1.2 \times 10^{-2}$ and $5.6 \times 10^{-3}$ ohm$^{-1}$ cm$^{-1}$, respectively.

EXAMPLE IV

A glass ceramic whose final composition was equivalent to 91.2 wt. % borax and 8.8 wt. % $AlCl_3$ or $(Na_2O)(B_2O_3)_2(AlCl_3)_{0.15}$ was prepared from:

| | wt. % |
|---|---|
| $Na_2B_4O_7$ | 71.38 |
| $B_2O_3$ | 13.73 |
| NaCl | 11.54 |
| $Al_2O_3$ | 3.35 |

The ionic conductivities measured at 300°, 250° and 200° C. were $2.4 \times 10^{-4}$, $1.5 \times 10^{-3}$ and $6.7 \times 10^{-4}$ ohm$^{-1}$ cm$^{-1}$, respectively. This composition failed to convert to a glass ceramic by slow cooling at 5° C./min., but formed a glass ceramic by crystallizing at 650° C. for 2 hours.

EXAMPLE V

A glass ceramic whose final composition was equivalent to 65.6 wt. % borax and 34.4 wt. % $PbBr_2$ or $(Na_2O)(B_2O_3)_2(PbBr_2)_{0.29}$ was prepared from:

| | wt. % |
|---|---|
| $Na_2B_4O_7$ | 46.77 |
| $B_2O_3$ | 13.04 |
| NaBr | 19.31 |
| PbO | 20.88 |

The ionic conductivities measured at 300°, 250° and 200° C. were $3.1 \times 10^{-3}$, $1.9 \times 10^{-3}$ and $1.3 \times 10^{-3}$ ohm$^{-1}$ cm$^{-1}$, respectively.

EXAMPLE VI

A glass ceramic whose final composition was equivalent to 90 wt. % borax and 10 wt. % $CaCl_2$ or $(Na_2O)(B_2O_3)_2(CaCl_2)_{0.20}$ was prepared from:

| | wt. % |
|---|---|
| $Na_2B_4O_7$ | 72.06 |
| $CaB_4O_7$ | 17.48 |
| NaCl | 10.46 |

The ionic conductivities measured at 300°, 250° and 200° C. were $5.2 \times 10^{-3}$, $3.6 \times 10^{-3}$ and $2.3 \times 10^{-3}$ ohm$^{-1}$ cm$^{-1}$, respectively.

EXAMPLE VII

Glasses having the compositions shown below were prepared and subjected to various heat treatment procedures to prepare glass ceramics. Ionic conductivity measurements were made at 300°, 250° and 200° C.

| Glass Composition (wt. %) | Additive (wt. %) | Heat Treatment | Observed Conductivities (ohm$^{-1}$cm$^{-1}$) | | |
|---|---|---|---|---|---|
| | | | 300° C. | 250° C. | 200° C. |
| 90 $Na_2B_4O_7$-10$FeCl_2$ | — | Cooling at 5° C. per min. | $1.1 \times 10^{-2}$ | $6.7 \times 10^{-3}$ | $3.1 \times 10^{-3}$ |
| 90 $Na_2B_4O_7$-10$FeCl_2$ | $CaBr_2$ (2.5) | Cooling at 4.5° C. per min. | $1.3 \times 10^{-2}$ | $9.8 \times 10^{-3}$ | $6.1 \times 10^{-3}$ |
| 90 $Na_2B_4O_7$-10$FeCl_2$ | $CaBr_2$ (2.5) | 1 hr. at 650° C. | $1.3 \times 10^{-2}$ | $9.9 \times 10^{-3}$ | $5.6 \times 10^{-3}$ |
| 90 $Na_2B_4O_7$-10$FeCl_2$ | $CaBr_2$ (5) | Cooling at 5.4° C. per min. | $1.4 \times 10^{-2}$ | $9.3 \times 10^{-3}$ | $6.5 \times 10^{-3}$ |

The result obtained with compositions containing 10 $FeCl_2$ show that the $CaBr_2$ additive promotes rapid crystallization over a wide range of temperatures so that the systems are essentially not affected by variations in the heat treatment procedures.

Effects similar to the above can also be obtained by adding NaF to haloborate compositions. Thus the material of composition (wt. %) 85.5 borax, 4.5 NaF, 10 $FeCl_2$ or $(Na_2O)(B_2O_3)_2(NaF)_{0.25}(FeCl_2)_{0.19}$ was also not affected by variations in heat treatment.

EXAMPLE VIII

A haloborate glass ceramic comprising 96 wt. % calcium borate ($CaB_4O_7$) and 4 wt. % calcium chloride was prepared by heating to 1250° C. to melt the ingredients and cooling to a temperature of 800° C. and holding for 2 hours to convert the calcium chloroborate glass into a glass ceramic.

Figure 3:
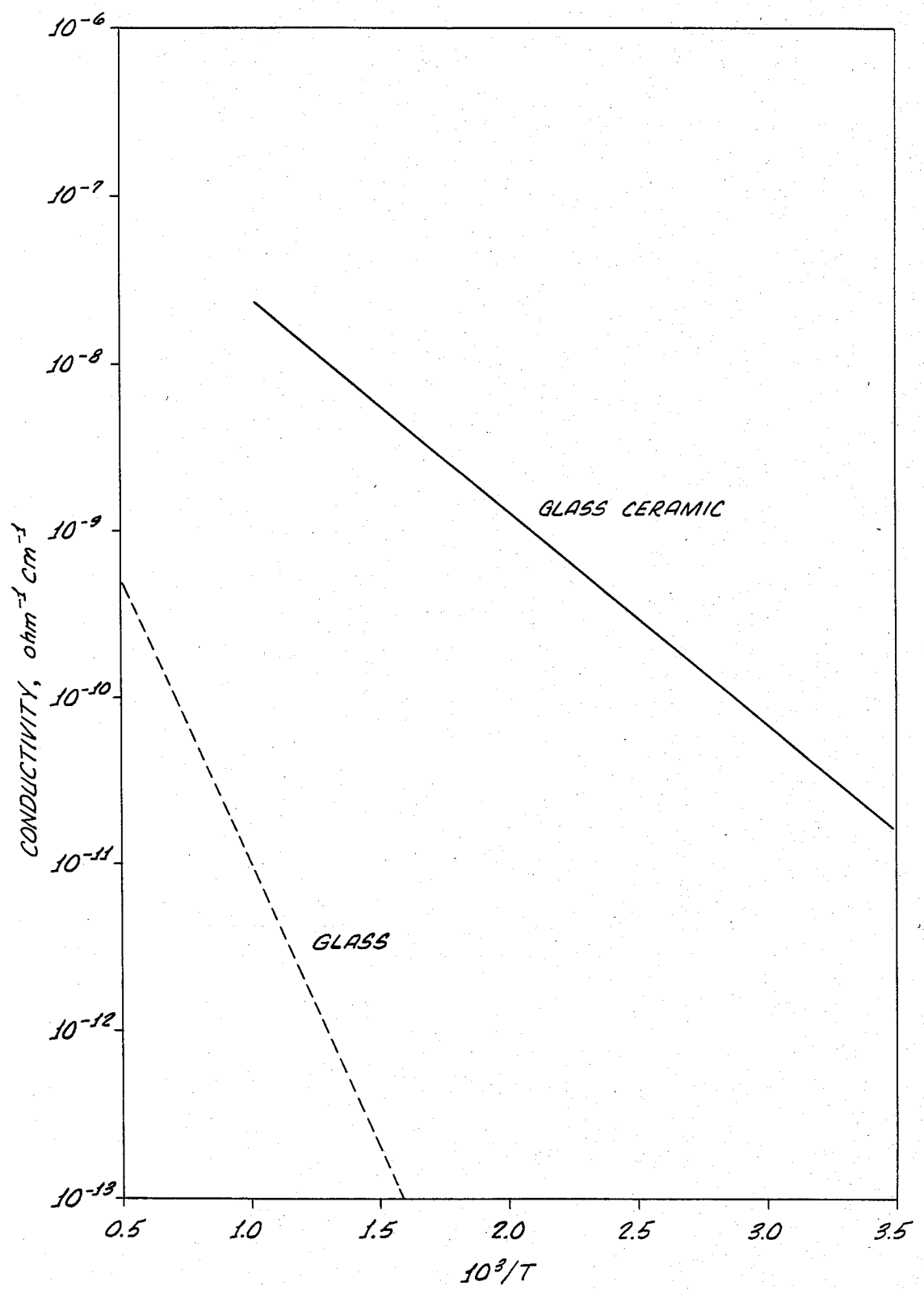
FIG. 3 is a graph comparing the conductivity of a glass ceramic of this invention with a glass of the same composition, as described in Example VIII.

Ionic conductivity measurements are shown in FIG. 3. In this system the conductivity is due to the mobility of the calcium ion.

EXAMPLE IX

To illustrate the use of a mixture of chlorides in preparing the compositions of this invention, a mixture of borax with four chlorides of the following composition (wt. %) was prepared: 81.6 borax, 3.13 $CaCl_2$, 3.58 $FeCl_2$, 3.84 $ZnCl_2$ and 7.85 $PbCl_2$ or $(Na_2O).(B_2O_3)_2.(CaCl_2)_{0.07}.(FeCl_2)_{0.07}.(ZnCl_2)_{0.07}.(PbCl_2)_{0.07}$. The charge was melted for 15 minutes at 850° C. and converted into a glass ceramic by cooling at 5° C./min. The ionic conductivities were determined at 300°, 250° and 200° C. and found to be $8.4 \times 10^{-3}$, $5.6 \times 10^{-3}$ and $3.4 \times 10^{-3}$ ohm$^{-1}$ cm$^{-1}$, respectively.

EXAMPLE X

The glass ceramic compositions of the present invention are useful as solid electrolyte in, for example, alkali metal-sulfur batteries. To demonstrate the resistance to attack by liquid sodium, samples of typical compositions were contacted with liquid sodium at 300° C. for periods up to 24 hours. It was found that none of the samples was affected.

Similarly, when contacted with liquid sulfur at 300° C. for periods up to 7 hours, none of the samples was affected.

As well as being useful as solid electrolytes in alkali metal-sulfur batteries, the glass ceramics of this invention find application in, for example, ion selective membranes, ion specific sensors for on-line analysis and other types of batteries including batteries capable of operating at room temperature.

Various changes and modifications of the invention can be made, and to the extent that such variations incorporate the spirit of this invention, they are intended to be included within the scope of the appended claims.

What is claimed is:

1. A solid, crystalline glass ceramic derived from a glass composition consisting essentially of sodium or calcium borate and a metal halide selected from the chlorides, bromides and iodides.

2. A glass ceramic in accordance with claim 1 in which said metal halide is selected from the chlorides and bromides of metals of Groups 2–8 of the Periodic Table of the Elements.

3. A glass ceramic in accordance with claim 1 in which said metal halide is selected from the transition metal and alkaline earth metal chlorides.

4. A glass ceramic in accordance with claim 1 in which said metal halide is selected from sodium chloride and sodium bromide.

5. A glass ceramic in accordance with claim 1 in which said borate is borax having a $Na_2O:B_2O_3$ ratio of 1:2.

6. A glass ceramic in accordance with claim 1 in which said glass composition contains up to about 30 weight percent of halogen.

7. A glass ceramic in accordance with claim 3 in which said glass composition contains about 5 to about 9 weight percent of chlorine.

8. A glass ceramic in accordance with claim 1 in which said glass composition contains about 10 to 20 weight percent of bromine.

9. A glass ceramic in accordance with claim 7 in which said borate is borax having a $Na_2O:B_2O_3$ ratio of 1:2 and said metal halide is $FeCl_2$.

10. A glass ceramic in accordance with claim 7 in which said borate is borax having a $Na_2O:B_2O_3$ ratio of 1:2 and said metal halide is $CrCl_3$.

11. A glass ceramic in accordance with claim 7 in which said borate is borax having a $Na_2O:B_2O_3$ ratio of 1:2 and said metal halide is selected from $FeCl_2$, $CrCl_3$, $CoCl_2$, $MnCl_2$, $ZnCl_2$, $CaCl_2$, $MgCl_2$, $PbCl_2$, $LaCl_3$, and mixtures thereof.

12. The method for forming a solid ionic conductor material which comprises heat treating an amorphous glass comprising sodium or calcium borate and a metal halide selected from the Group 2–8 metal chlorides, bromides and iodides, sodium chloride and sodium bromide, thereby forming crystal phases within said amorphous glass and converting said glass to a crystalline glass ceramic having an increased low temperature ionic conductivity.

13. The method in accordance with claim 12 in which said heat treatment is at a temperature in the range of about 550°–650° C.

14. The method in accordance with claim 13 in which said borate is borax having a $Na_2O:B_2O_3$ ratio of 1:2.

15. The method in accordance with claim 12 in which said amorphous glass contains about 5 to 9 weight percent chlorine.

16. The method in accordance with claim 12 in which said metal halide is at least one chloride or bromide of a metal in Groups 2–8 of the Periodic Table.

17. An alkali metal-sulfur storage battery containing a solid electrolyte in which said electrolyte is a crystalline glass ceramic consisting essentially of sodium or calcium borate and a metal halide selected from the chlorides, bromides and iodides of the metals of Groups 2–8 of the Periodic Table of the Elements, sodium chloride and sodium bromide.

18. A storage battery in accordance with claim 17 in which said borate is borax having a $Na_2O:B_2O_3$ ratio of 1:2 and said metal halide is a chloride selected from $FeCl_2$, $CrCl_3$, $CoCl_2$, $MnCl_2$, $ZnCl_2$, $CaCl_2$, $MgCl_2$, $PbCl_2$, $LaCl_3$ and mixtures thereof.

19. A storage battery in accordance with claim 17 in which said glass ceramic contains about 5 to 9 weight percent of chlorine.

20. A solid, crystalline glass ceramic consisting essentially of a material of the formula $$[A_aO]_y \cdot [B_2O_3]_2 \cdot [MX_b]_z$$

where
A is sodium or calcium;
M is at least one metal selected from Groups 2–8 of the Periodic Table and sodium;
X is halogen;
a is 1 or 2;
y is 0.9 to 2;
b is the valence of M; and
bz is 0.25 to 0.70.

21. A solid, crystalline glass ceramic according to claim 20 in which X is chlorine or bromine.

22. A solid crystalline glass ceramic according to claim 21 in which bz is 0.35 to 0.60.

23. A storage battery in accordance with claim 17 in which said electrolyte consists essentially of a glass ceramic of the formula $$[A_aO]_y \cdot [B_2O_3]_2 \cdot [MX_b]_z$$

where
A is sodium or calcium;
M is at least one metal selected from Groups 2–8 of the Periodic Table and sodium;
X is halogen;
a is 1 or 2;
y is 0.9 to 2;
b is the valence of M; and
bz is 0.25 to 0.70.

24. A storage battery in accordance with claim 19 in which said electrolyte consists essentially of a glass ceramic of the formula $$[A_aO]_y \cdot [B_2O_3]_2 \cdot [MX_b]_z$$

where
A is sodium or calcium;
M is at least one metal selected from Groups 2–8 of the Periodic Table and sodium;
X is halogen;
a is 1 or 2;
y is 0.9 to 2;
b is the valence of M; and
bz is 0.25 to 0.70.

* * * * *